(12) United States Patent
Cohen-Ganor et al.

(10) Patent No.: US 8,661,538 B2
(45) Date of Patent: Feb. 25, 2014

(54) SYSTEM AND METHOD FOR DETERMINING A RISK ROOT CAUSE

(75) Inventors: Shlomi Cohen-Ganor, Beit Zayit (IL); Wesley Kenneth Wilhelm, Spokane, WA (US); Pinchas Ben-Or, Issaquah, WA (US)

(73) Assignee: Nice-Systems Ltd., Ra'anana (IL)

( * ) Notice: Subject to any disclaimer, the term of this patent is extended or adjusted under 35 U.S.C. 154(b) by 0 days.

(21) Appl. No.: 13/467,412

(22) Filed: May 9, 2012

(65) Prior Publication Data
US 2013/0305356 A1    Nov. 14, 2013

(51) Int. Cl.
*G06F 21/00* (2013.01)
*H04L 29/06* (2006.01)

(52) U.S. Cl.
CPC ......... *H04L 63/1416* (2013.01); *H04L 63/1408* (2013.01)
USPC .............................................. 726/22; 705/30

(58) Field of Classification Search
CPC ............ H04L 63/1416; H04L 63/1408; H04L 63/1433
USPC .............................................. 726/22; 705/30
See application file for complete search history.

(56) References Cited

U.S. PATENT DOCUMENTS

| | | | |
|---|---|---|---|
| 2007/0112667 A1* | 5/2007 | Rucker | 705/38 |
| 2010/0303211 A1* | 12/2010 | Hartig et al. | 379/1.01 |
| 2012/0130853 A1* | 5/2012 | Petri et al. | 705/26.35 |
| 2012/0226590 A1* | 9/2012 | Love et al. | 705/30 |

OTHER PUBLICATIONS

Allan, "Towards Fraud Detection Methodologies", 2010, IEEE, p. 1-6.*

* cited by examiner

*Primary Examiner* — Thanhnga B Truong
*Assistant Examiner* — Gregory Lane
(74) *Attorney, Agent, or Firm* — Pearl Cohen Zedek Latzer Baratz LLP

(57) ABSTRACT

A system and method for determining a risk root cause are provided. A first and second fraud related risk scores respectively associated with a first and second nodes may be determined. A relation strength value related to at least one relation between the first and second nodes may be determined. A relation strength value and a first and second node risk scores may be used to calculate a cluster risk score for a cluster including the first and second nodes. Other embodiments are described and claimed.

16 Claims, 8 Drawing Sheets

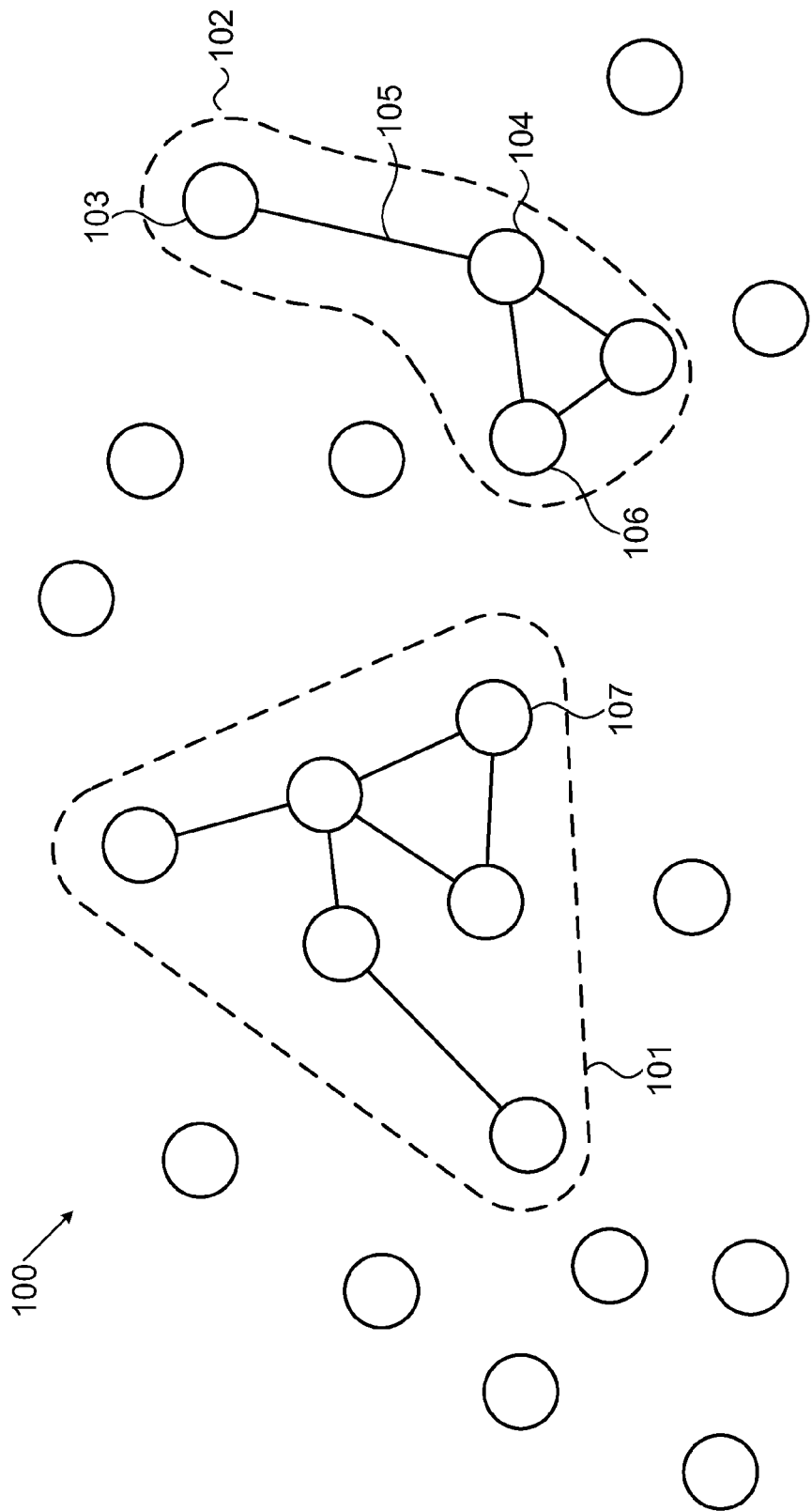

SYSTEM AND METHOD FOR DETERMINING A RISK ROOT CAUSE

FIELD OF THE INVENTION

The present invention is generally related to identifying risks, and particularly to identifying a risk root cause.

BACKGROUND OF THE INVENTION

Advancements in computing and communication technologies have enabled significant changes in the way financial institutions, businesses, organizations, government agencies and the like operate and function. In many such organizations, institutions or agencies, electronic business documents or transactions comprise the formal and/or official form of transacting business. A large number and variety of documents and transactions are regularly exchanged between, for example, agencies and business partners, financial institutions and the private sector regardless of distance and geographic location. Many business or other transactions involve a transfer of confidential, sensitive and/or private information or data as well as comprise business transactions such as purchase orders or money transfers. For example, many such transactions involve a transfer of money, e.g., between bank accounts.

Some of these transactions may be a result of fraudulent activity. For example, a "fraudster" may use a transaction to transfer money from its rightful owner's bank account to an account maintained or owned by the fraudster. If not blocked before processing, such fraudulent transactions or transfers may cause a direct loss of money.

Identifying and/or detecting fraudulent transactions may be a complicated task, and given the high volumes, time constraints and complexity, typically involve automated and/or semi-automated fraud identification and/or detection systems coupled with some level of human surveillance. For example, analytical models implemented in software may be used to identify, detect and/or prevent fraud. Other means of detection and/or prevention of fraudulent transactions may be statistical analysis of historical data and manual surveillance. However, these means typically require substantial resources such as time, computing systems and money.

Specifically, current systems and methods are not suitable for processing very large numbers of transactions. For example, current systems and methods do not enable determining a root cause or source associated with a number of fraudulent activities.

SUMMARY OF EMBODIMENTS OF THE INVENTION

Embodiments of the invention may enable determining a risk root cause. A system or method may determine, or be provided with, a first and second fraud related risk scores respectively associated with a first and second nodes. A relation strength related to a relation between the first and second nodes may be determined or obtained. The relation strength and the node risk scores may be used to calculate a cluster risk score for a cluster of nodes that includes the first and second nodes. A cluster of nodes may be extended to include an additional node. A cluster risk score for the extended cluster may be calculated based on a risk score associated with the additional node and a relation strength of a relation between the additional node and a node included in the cluster.

Calculating a cluster risk score may include identifying paths between nodes, determining relation strength values of relations included in the paths and calculating a cluster risk score based on the relation strength values. A path may traverse a plurality of nodes in a cluster. A constant node risk score may be assigned to unprocessed nodes, the constant node risk score may be replaced by a calculated node risk score when all paths traversing a node have been examined. An alert may be generated if a cluster risk score meets a predefined criteria. A first and second clusters may be joined based on a relation between a first and second nodes respectively included in the first and second clusters. Nodes in a cluster may be selected for processing based on an estimated contribution to the cluster's risk score. A cluster risk score may be dynamically modified based on events to a node included in the cluster.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 1A diagrammatically shows a network of nodes, clusters of nodes, and relations between nodes according to embodiments of the invention;

Figure 1B:
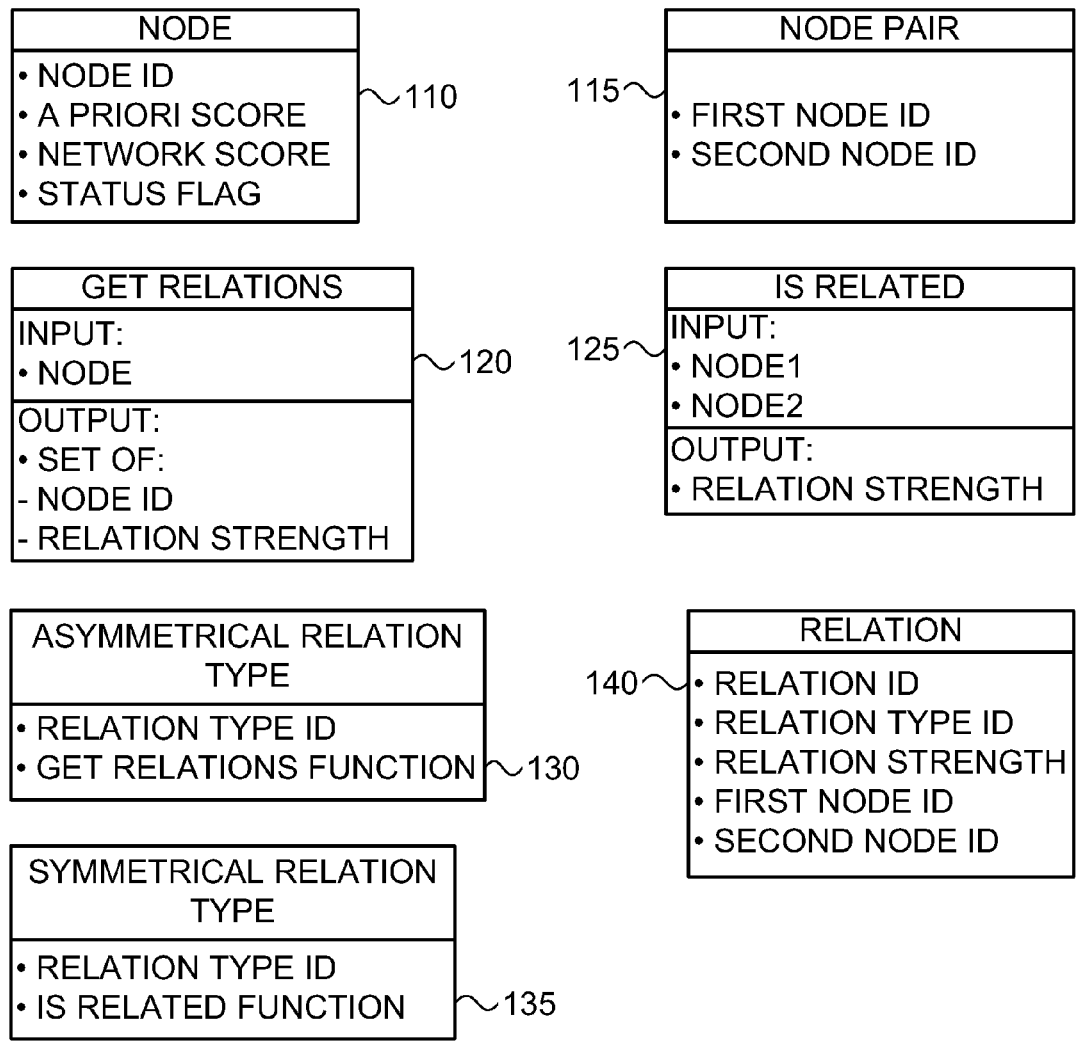
FIG. 1B diagrammatically shows structures and functions according to embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention enable determining a fraud related risk root cause. An embodiment of the present invention may effectively identify events of interest, for example fraudulent events, within a large volume of events. A fraud related link or connection between a number of entities or events may be automatically discovered. For example, by identifying a set of relations between a set of events and/or entities, the set of events and/or entities may be linked and may further be associated with a risk factor. As described herein, events (e.g., financial transactions) or entities (e.g., persons) that when examined separately or individually, may raise no suspicion of possible fraudulent activity or seem to pose no risk, may, using embodiments of the invention, be identified as risk related entities. Accordingly, the invention may improve the accuracy of a risk scoring system, e.g., a transactional fraud risk scoring system, thus leading to higher detection rates and/or lower false positive rates of such system. For example, an embodiment may analyze direct and/or indirect relations between suspicious and/or unsuspicious events, and identify potential groups of risk related events that originate from a common root cause, for example multiple fraudulent transactions that were enabled through a single data theft incident may be identified. As described herein, an embodiment may calculate an augmented risk score for a set of events or entities. An augmented risk score may be based on a priori risk scores associated with events or entities and various characteristics of inter-relations between the events and/or entities.

Embodiments of the present invention enable identifying sets or groups of events and/or entities having a common risk related cause or source. Events and/or entities which, using known in the art systems and methods, may exhibit no common risk root cause, may be identified and may be associated with a common risk root cause. As described herein, embodiments of the invention may identify a common risk root cause related to a set, cluster or group of events and/or entities even if data related to the actual common risk root cause is unavailable to a system or method according to embodiments of the invention.

Reference is now made to FIG. 1A which shows a network of nodes 100, clusters of nodes, and relations between nodes according to embodiments of the invention. As shown by network 100, a network of nodes may include a possibly large number of nodes. For example, a network of nodes representing transactions, addresses, customers, credit cards and social security numbers (e.g., generated for a bank or a contact center) may include hundreds of millions of nodes.

Nodes may represent any real-world object, aspect, entity or event. For example, node 103 may be (or may represent) an address, node 104 may represent a customer, node 106 may represent a transaction and node 107 may represent a credit card. As graphically shown by 105, relations may exist between nodes. For example, the address represented by node 103 may be the mailing address for the customer represented by node 104, accordingly, a relation 105 between nodes 103 and 104 is identified and represented as further described herein.

As shown by 101 and 102, clusters, groups, sets or subsets of nodes may be identified and/or defined. For example, a cluster of nodes may include a set of inter-connected nodes as shown by 101 and 102. For the sake of simplicity and clarity, additional definitions and operations according to embodiments of the invention are omitted from FIG. 1A. For example and as further described herein, clusters of nodes may be combined or joined. For example, clusters 101 and 102 may be joined into a single cluster, e.g., based on a relation between nodes 106 and 107. In other cases, a cluster may be broken into a number of clusters, e.g., based on determining that a previously established relation between nodes no longer exists. For the sake of simplicity and clarity, only two clusters are shown in FIG. 1A, however, it will be realized that embodiments of the invention may define any number of clusters similar to clusters 101 and 102. In fact, in a typical embodiment, a very large number of clusters may be defined in a network of clusters.

Embodiments of the invention may best be described using a number of data structures as described below. It will be understood that other data types and/or data objects, as well as related operations may be used in other embodiments without departing from the scope of the present invention. For example, two or more data objects described herein may be combined into a single object or structure. Likewise, two or more functions described herein may be combined into a single function or operation. As referred to herein, nodes may represent real-world events such as financial transactions, or real-world entities such as people, accounts, or addresses, e.g., a residential address or a business address. In an embodiment, a node may be represented by a data structure as described further below, accordingly, the term "node" as used herein may refer to a data structure or a data object representing a node.

As described herein, events and/or entities may be represented by nodes (e.g., as described herein with reference to FIG. 1A). An embodiment may use a priori risk factors, scores or other parameters that may be associated with nodes representing events or entities. A priori scores associated with nodes representing real-world events or entities may be used to identify, in a large network of nodes, a relatively small number of nodes associated with events or entities which are likely to pose a risk. Generally, it may be assumed that a majority of nodes in a large network of nodes are associated with an a priori score of zero indicating these nodes are not associated with any risk. According to embodiments of the invention, nodes representing real-world events or entities associated with a confirmed risk event, for example confirmed fraudulent activity may be associated with significantly higher a priori scores than other nodes.

In an embodiment, nodes representing real-world events or entities that were associated with a suspected risk event may be associated or assigned an a priori score that is proportional to the level of confidence that a risk event occurred. An a priori score calculation may incorporate an inverse measure of the time that elapsed since a suspected or confirmed risk event occurred, such that recent suspected or confirmed risk events would have higher impact on the a priori score. An a priori score calculation may incorporate a measure of the severity of a suspected or confirmed risk event. For example, nodes representing financial transactions may incorporate the monetary value of the transaction in the a priori score. Nodes representing bank accounts may incorporate a measure of the relative importance of the account to the bank's business. For example, "Gold/Platinum" accounts may be assigned higher a priori scores than other accounts. Alternately or additionally, the relative importance of the account may be measured by the average balance maintained in the bank account, or other similar indications of relative value.

In another embodiment, an external system or method may be used in order to associate events or entities (or nodes representing event or entities) with a priori risk scores and an embodiment of the present invention may use such a priori risk scores in order to determine a risk score which is common to a set of events or entities. Accordingly, embodiments of the invention may operate independently from a system or method used in order to associate events or entities with initial or a priori risk scores, factors or other risk parameters. Alerts may be generated or raised for a set, cluster, group or network of nodes. As described herein, "network alerts" may be generated for a set or network of events and/or entities. For example, an alert indicating that a set (or network) of events and/or entities is suspected of being related to a fraudulent activity or risk may be generated.

Reference is now made to FIG. 1B which diagrammatically shows structures and functions according to embodiments of the invention. As shown by 110, a node may include a node identification parameter (e.g., a number or a text string). As shown, a node identification may be referred to herein as node ID. As further shown, a node may include an a priori score that may be a non negative number (e.g., an integer). An a priori risk score may be associated with a node by any applicable system or method. For example, a user may associate a node (e.g., a transaction or person) with an a priori risk score. In other cases, an a priori score may be automatically assigned to a node. For example, a system or an application executed by a computing device may associate nodes with a priori risk scores based on various criteria or rules. For example, based on an amount in a transaction, time of day, source or destination accounts and the like, a risk score may be associated with a transaction and consequently, with a node representing the transaction.

A node may include (or be associated with) a network score that may be a non negative number (e.g., an integer). As also shown, a node may include a status flag. Items included in a node as shown by 110 are further described below. As shown by 115, embodiments of the invention may use a node pair object. A node pair may include a first and second node IDs. For example, a node ID included in a node pair object may reference a node as shown by 110. In an embodiment, node pairs may be used to track nodes that were already tested for, or determined to have, inter-node relations (e.g., symmetric relations as explained further below).

As shown by 120, a "get relations" function may accept an input node (e.g., a node ID) as input and may return a set of nodes related to the input node, or an empty list if no related nodes are detected. For example and as shown, an output of a "get relations" function may include a node ID and an indication of a relation strength, e.g., a positive integer that may reflect the strength of a relation between the input node and an output (or detected) node. A "get relations" function may identify (and provide, e.g., as output) related nodes according to a specified type of relation. For example, an input node may be (or may represent) a person and related nodes returned by the "get relations" function may be credit cards owned by the person or transactions related to a specific product purchased by the person. A "get relations" function may receive as input a node (e.g. an event or an entity) and may return a set of nodes that are related to the input node via a specific relation type. For example, a get relations function may be a function that receives as input an employee (e.g., a sales person or an agent in a contact center) and returns as output that employee's accounts (the output nodes). If the input node (for example the employee) does not have any related nodes (for example, no accounts are related to the employee), the "get relations" function may return an empty set. As another example, a "get relations" function may be a function that receives as input an account and returns as output the addresses associated with that account.

It will be realized that the scope of the present invention is not limited by the type or other aspects of the "get relations" function discussed herein. For example, the "get relations" function may receive or obtain any relevant information from any applicable source in order to determine or identify relations. For example, in order to determine a relation between a node representing a specific person and a node representing a transaction, a database (e.g., owned and/or operated by a bank or a contact center) may be queried and transactions made by the person may be examined in order to determine whether the transaction was made by that specific person. Similarly, any other source of information may be used by the "get relations" function. Likewise, any computations or calculations may be performed by the "get relations" function without departing from the scope of the present invention.

A parameter related to a relation strength, e.g., a relation strength value or other parameter produced by the "get relations" function may be based on any applicable information, criteria or calculation. For example, predefined rules may dictate that a first relation type is to be associated with a predefined initial strength value and further considerations or calculations may alter such initial strength value. For example, a relation between a person and a credit card may initially be assigned a first relation strength value, but determining the person is not the only user of the credit card (e.g., detecting a relation of the credit card with another person) may cause an alteration of the initial strength value, e.g., a decrease of the relation strength. Accordingly, it will be realized that any method, calculation or information may be used in order to determine a relation strength (e.g., by the "get relations" and "is related" functions described herein) without departing from the scope of the present invention.

As shown by 125, an "is related" function may receive two nodes as input and may provide a relation strength as output. A lack of relation between the input nodes may be indicated by a strength of zero ("0"). In an embodiment, an "is related" function may receive as input a pair of nodes or node IDs (e.g. events or entities) and may return an indication of whether they are directly related via one specific relation type, and the strength of that relation. For example, an "is related" function may receive as input two addresses and may return as output a measure of how similar the addresses are, with zero indicating that the addresses are completely dissimilar. Where applicable, the discussion related to determining a relation strength with respect to the "get relations" function is relevant to the "is related" function, therefore, similar aspects are not repeated.

As shown by 130 and 135, embodiments of the invention may define and use a "relation type" object or data structure. A relation type object may include a relation type identification (also referred to herein as relation ID) and either a "get relations" function or an "is related" function. For example and as shown by 130 and 135, a relation type may be "asymmetric" or it may be "symmetric". In an embodiment, a relation type associated with a "get relations" function is referred to, or treated as, an asymmetric relation and a relation type associated with an "is related" function is referred to, or treated as, a symmetric relation. A relation type represents a specific way to define relations between nodes. For example, relations between accounts owned by an employee and the employee may be asymmetric and relations between two or more addresses may be symmetric. In one aspect, asymmetric relations may be identified by starting from a single node and, possibly using information related to the node, identifying relations with other nodes. In contrast, symmetric relations may be determined, identified or discovered by examining two or more nodes and identifying relations based on information in the two or more nodes.

As shown by 140, embodiments of the invention may define and use a "relation" object or data structure. As shown, a relation object or data structure may include a unique relation identification (ID), a relation type ID, a relation strength, a first node ID and a second node ID.

Generally, a relation represents a specific relation between two specific nodes, for example, a relation between a specific account and a specific employee (who may own the account). A relation may be directional, accordingly, a relation strength may be related to a direction. For example, a relation object 140 (and associated strength) may represent the relation from a first node to a second node and not vice versa. Accordingly, more than one relation between two nodes may exist. For example, a first relation from node 1 to node 2 with relation strength 10 and a second relation from node 2 to node 1 with relation strength 5. Multiple relations between nodes may exist. For example, two people may be related by having similar names, and by having the same residential address. In such exemplary case, a first relation may be based on the similar names and a second relation may be based on the similar addresses.

A set of nodes and/or node pairs and related relations (e.g., relations between nodes or node pairs) may be referred to herein as a "network of nodes" or simply a "network". Other terms used herein to refer to a set of related nodes (e.g., nodes linked by one or more relations as described herein) are a cluster, a subset or simply a set of nodes. Various constraints or rules may be applied when defining a network of nodes. In an embodiment, nodes of no interest may be excluded from a network of nodes. For example, nodes that have both an a priori score of zero ("0") and a network score of zero ("0") may be excluded from a network of nodes. As described herein, scores associated with nodes (e.g., an a priori score and a network score) may indicate a level of risk associated with a node. Accordingly, nodes associated with a zero ("0") score may be nodes associated with no risk (or with a very low risk), such nodes may be excluded from a network of nodes. In another case, a node associated with a zero ("0") score may be a node that has no relation with any suspicious node. For example, a node which by itself is not associated with any risk nor associated with any other node, which in turn is associated with a risk, may be excluded from a network of nodes. Excluding nodes from a network of nodes as discussed above may simplify and expedite calculations and/or computations by devoting little or no resources to nodes which are not associated with risks.

A network of nodes may be dynamically and/or continuously updated, modified or otherwise manipulated. For example, an update component or unit may add nodes to a network, remove nodes from a network or modify nodes in a network so that a network of nodes represents real-world entities, events or processes in real-time. For example, adding a node to a network may be done when a new relevant entity is detected or identified. For example, events such as a new transaction performed or a new credit card acquired by a person may cause addition of nodes to a network. Adding a node to a network of nodes may include generating and/or defining a new node, e.g., as shown by 110 in FIG. 1B. Generating and/or defining a new node may include populating some or all fields as shown by 110.

For example, a new and/or unique identification (ID) parameter for a new or added node may be generated, e.g., an ID not associated with any other node in the network of nodes. Accordingly, node identification numbers or values may be generated such that no two nodes in a network are assigned the same identification number or identifier. An a priori score value may be received or generated. For example, a risk level associated with a new node may be received from any applicable source and may be used as the a priori score of a new or added node. Any system or method may be used to define an a priori risk level or score (or other risk related value) of a node. For example, based on an amount in a transaction, a geographical area, a time of day or any parameter related to a person, service or purchased goods, a risk related value may be defined and an a priori score assigned to a new or added node may be based on such risk related value or parameter. Accordingly, an a priori score may reflect a risk level associated with a new or added node when the node is added to a network. A network score of a new or added node may initially be set to be equal to the a priori score.

The status flag of a new or added node may be set to "TRUE", e.g., in order to indicate that the node has not yet been processed, e.g., in order to determine its relations with other nodes in the network. As referred to herein, a processed node may be a node for which relations with other nodes have been determined or identified. Similarly, an unprocessed node as referred to herein may be a node with respect to which not all relations with other nodes are known, have been determined or have been identified. Accordingly, a status flag set to "TRUE", "1" or any other non-zero value may indicate the node needs to processed or that there may be unidentified relations between the node and other nodes (e.g., due to an update or change in a network of nodes or the node itself). A status flag set to "0" or "NULL" value may indicate the node needs not be processed, or that relations between the node and other nodes are known, determined or identified. Accordingly and as described herein, the status flag of new or updated nodes may be set to "TRUE" and the status flag of nodes that were processed may be set to "0".

Nodes in a network may be dynamically updated, e.g., so that they reflect changes in real-time. For example, if a risk level of an entity (e.g., a person or a business) changes then one or more nodes associated with the relevant entity may be changed so that they accurately represent the entities they represent. For example, an a priori score may be set to some new non-negative number, e.g., to reflect a change in risk level or a status flag may be changed to reflect that the node has been processed.

In some cases, following a modification or update of a node, sets of node pairs that include the updated or modified node may be removed from a network. Removal of pairs associated with modified nodes may cause the updated node to be re-evaluated for symmetric relations (or pairing) with other nodes. For example, following an update of a node, it may no longer be appropriate for the node to be paired with a first node and it may further be appropriate to pair the updated node with a second node. Accordingly, by removing all pairing related to an updated node and recalculating pairing of the node with other nodes in the network, embodiments of the invention may maintain accurate or correct pairing of nodes in a network.

In an embodiment, nodes in a network of nodes may be examined and/or processed continuously. A system may iterate through nodes in a network of nodes, select a node and define and/or examine relations of a selected node with other nodes in the network. Node pairs in a network of nodes may be selected and relations between pairs of nodes may be examined, defined and/or determined. Network scores may be associated with a set or cluster of nodes in a network of nodes.

A number of processes may be executed simultaneously and/or continuously. For example, a first process may continuously iterate through nodes in a network of nodes and identify, define or determine asymmetric relations between a selected node and other nodes in the network. A second process may continuously iterate through nodes in a network of nodes, select node pairs and identify, define or determine symmetric relations between selected node pairs. A network score may be associated with clusters or groups of nodes based on one or more concurrently executed processes, for example, a network score may be defined for a set of nodes based on symmetric and/or asymmetric relations discovered, identified or defined by processes described herein. Yet other processes that may be executed simultaneously or concurrently may be a process that removes nodes from a network of nodes and/or a process that adds nodes to a network of nodes.

In an embodiment, process described herein, e.g., process related to determining relations between nodes and assigning scores to nodes, may be performed in an endless loop. Process described herein may be performed according to various considerations, rules, triggers or events. For example, a process of identifying relations between nodes may be triggered by an addition of a new node to a network of nodes, a process of removing nodes from a network may be executed only when a system resources (e.g., a central processing unit (CPU)) utilization is low. Other conditions or criteria may be a time of day or a predefined schedule for execution of a process. It will be understood that embodiments of the invention are not limited by the rules, events or criteria used in order to select to execute one or more processes related to determining a risk root cause link as described herein.

Figure 2:
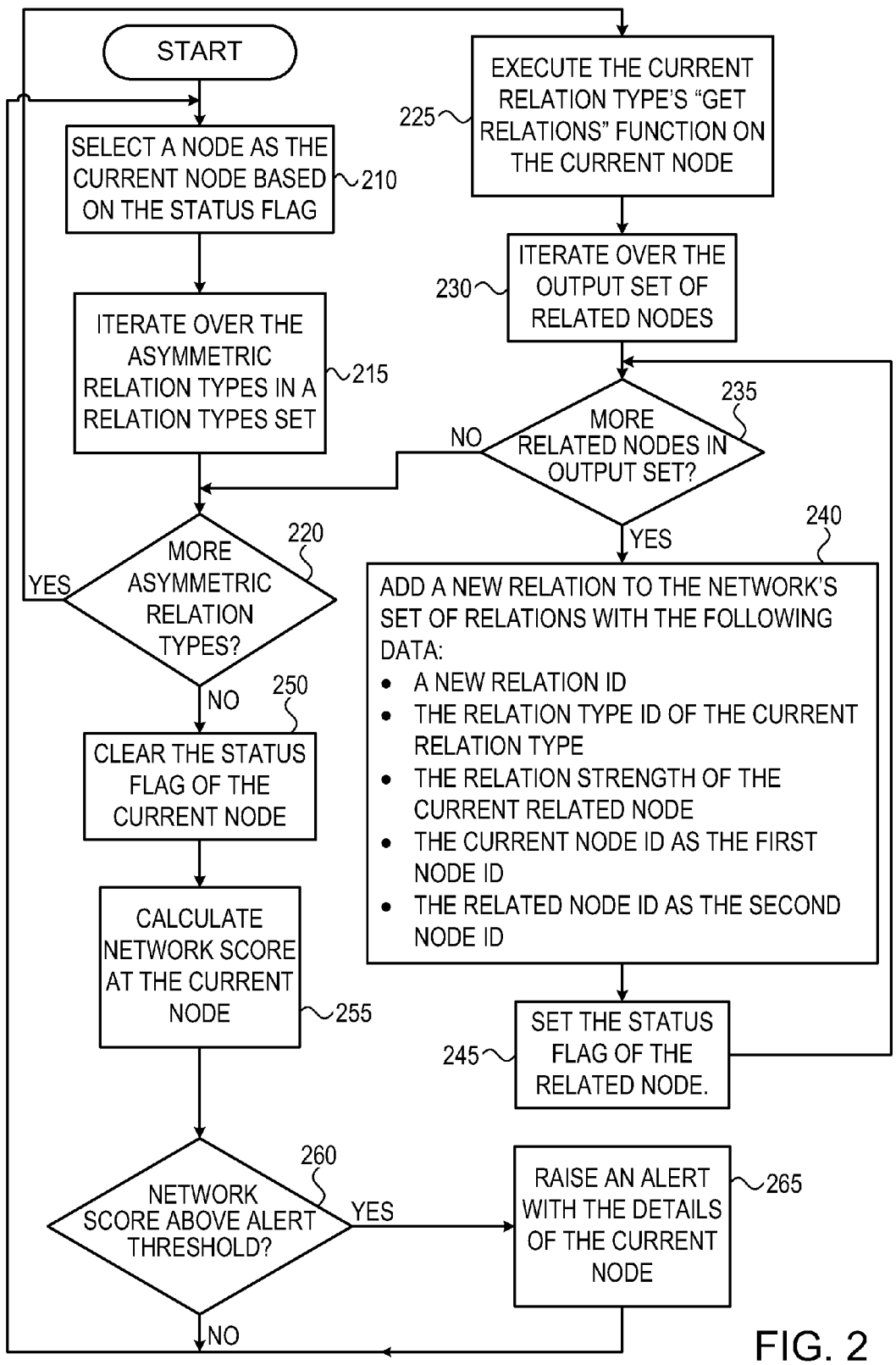
FIG. 2 shows a method of determining a network score according to embodiments of the invention.
Figure 3:
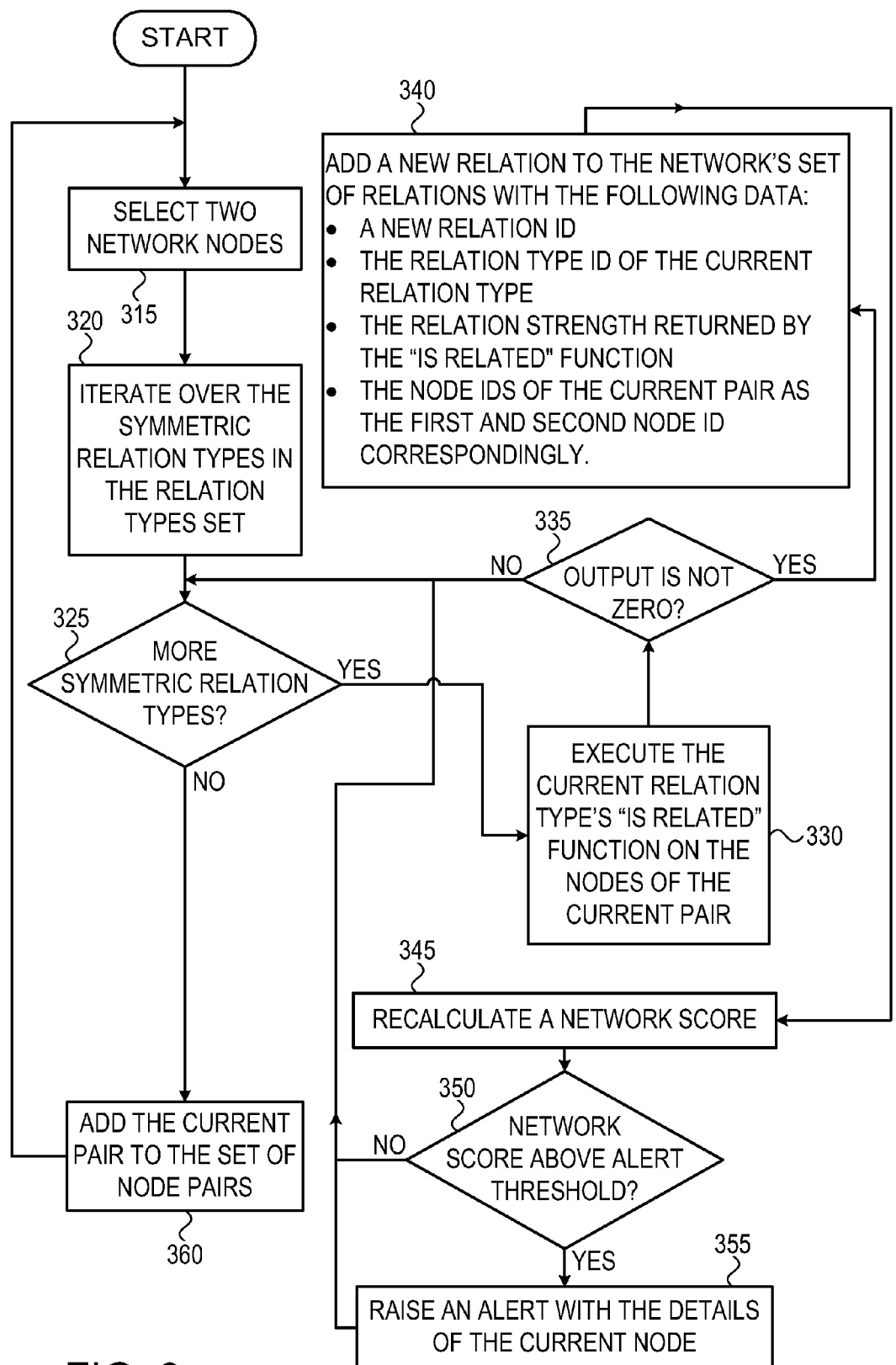
FIG. 3 shows a method of determining a network score according to embodiments of the invention.

Reference is made to FIG. 2 that shows a method or flow of determining a network score according to embodiments of the invention. It will be understood that the flows described herein, e.g., with reference to FIG. 2 and FIG. 3, are not constrained to a particular order or sequence. For example, some of the described operations in the methods and flows described herein may occur or be performed at the same point in time. Operations included in the methods described herein may be optional. Accordingly, in some embodiments, some of the operations included in the flows described herein may be omitted without departing from the scope of the present invention.

As described herein, the method includes identifying an asymmetric relation between nodes and calculating a network score based on one or more asymmetric relations. As shown by block 210, the method may include selecting a node as the current node based on a status flag. For example, a status flag in a node may be set to "TRUE" or "1" when a node is added to a network or when conditions relevant to a node change. In an embodiment, a status flag set to "TRUE" or "1" may indicate the node should be processed, e.g., in order to determine its relations with other nodes. A status flag may be cleared (e.g., set to "FALSE" or "0") in order to indicate the node needs not be examined or processed. For example, after identifying relations of a node and/or setting a network score based on identified relations of a node with other nodes, the status flag of the node may be cleared. Accordingly, a method may select a node for examination (e.g., select the node to be "a current node") if the status flag of the node is set to "TRUE".

As shown by block 215, the method may include iterating over a set of asymmetric relation types in a relation types set. Generally, asymmetric relations as referred to herein may be identified by executing a "get relations" function as described herein. For example, asymmetric relations may be discovered or identified by iterating over a set of items in a node and determining, for each item in the set whether the item is associated with another node in a network of nodes. For example, a "get relations" function may obtain or be provided with a credit card number (that may be a first node or may be included in a first node) and discover that the credit card is associated with a specific transaction (that may be a second node or may be included in a first node). A relation discovered, determined or identified by determining a relation between a first node (or a first item included in a node) and a second node or item may be referred to herein as an asymmetric relation. A set of relation types may be preconfigured or otherwise obtained. For example, a user may configure a system with a set of relation types that may later be automatically determined by a system. For example, a relation between a credit card and transactions executed using the card, a relation between an employee and accounts owned by the employee, a relation between an account and that account's mailing address(es) may all be relations or relation types configured by a user. Each relation may have, or be associated with, a distinct get relations function that determines for a given input node who are the related nodes e.g. by querying a database table. In an embodiment, there may be one get relation function per relation type and vice versa.

As shown by block 220, the method may include determining whether more asymmetric relation types may be identified for the current or selected node. For example, based on a set of predefined relation types and items, a method may determine if more relations for a selected or current node may be discovered. For example, a set of relation types may include items for which relations may be searched. A set of relation types may include the types of relations to search for and/or a set of relation types may include item pairs between which relations are to be identified. For example, a set of relation types may dictate that for an item such as a person name relations with items such as residential address and social security number are to be searched for. Accordingly and as shown by block 220, if a node is (or includes) a person's name, a system may attempt to find a relation between the person's name and a node which includes a related residential address. In another example, a system may further attempt to find a relation between the person's name (e.g., the node which is the person's name) and a node which is or which includes, the person's social security number.

As shown by block 225, if it was determined that more asymmetric relation types may be identified for the current or selected node, the method may include executing the "get relations" functions for additional relation types. Accordingly, a method may iterate over all possible relations types. A set of relation types may be predefined. For example, a set of relation types may define a relation between a person's name and an address, or between an SSN and a phone number. Accordingly, embodiments of the invention may attempt to establish relations of various types between nodes.

As shown by 225, for each type of relation, a method may execute the "get relations" function. Accordingly, relations between the current node and nodes in a network of nodes may be discovered for each relation type.

Any information may be used in order to establish a relation between nodes or otherwise link nodes as shown by 225. For example, a bank may possess information that links a person to a credit card, a home address, a phone number and the like. In one embodiment, information or parameters included in a node may be used in order to find additional information that may be used to link or associate nodes. For example, a person's name included in a node may be used to find details such as an address or phone number. For example, using a person's name, a database may be queried in order to find information such as the person's address, SSN etc. Information obtained from a database or any other applicable source may be used in order to establish relations as described herein. For example, using a person's name, the person's home address may be found in a database, a node including the person's address may be located in a network of nodes and a relation between node including the person's name and a node including the address may be established.

As shown by block 230, the method may include iterating over the output set of related nodes. For example, an output of iterating over a set of predefined possible relations as shown by block 225 may be a set of related nodes. A set of related nodes may be a set of nodes identified by determining a link between a current node and the related nodes. For example, a method may examine a current (or first) node and discover that a second and third nodes are related to the current node, e.g., an address in the first node is related to a person in a second node and a credit card number in a third node. Accordingly and as shown by block 230, the set of related nodes (also referred to as the output set of related nodes) may be processed as described herein. As shown by block 235 and the arrow connecting blocks 235 and 220, the process may be repeated for all possible or predefined asymmetric relation types. For example, a first relation between a first and second nodes may be identified based on a first relation type and a second relation between the first and second nodes may be determined based on a second relation type.

As shown by block 240, the method may include adding a new relation to the network's set of relations. A relation between nodes may be represented by a structure or object referred to herein as a relation object. Adding a relation may include generating a new relation identification (relation ID) and recording, e.g., in a relation object, a number of items. For example, adding a new relation may include recording the newly generated relation ID, the relation type (e.g., an identification of the added relation type), a relation strength parameter or value, and identifications of the endpoints (nodes) of the added relation.

A relation strength parameter or value may be determined based on any applicable information or consideration. For example, a relation strength may be determined based on a confidence level. In another embodiment, a relation strength may be an integer between one ("1") and zero ("0") reflecting the probability that the relation is correctly identified or determined. In yet other embodiments, a relation strength may be determined based on a relation type or based on the information used in order to identify the relation. For example, a relation between a person's name and an SSN may be stronger than a relation between a person's name and a home address, e.g., since a home address may be more easily and/or more frequently changed than an SSN. A system may determine a relation strength based on preconfigured parameters. For example, a configuration parameter may determine a specific relation strength for specific relation types. A configuration parameter may determine a specific relation strength for a relation between specific node types. A relation strength may be determined based on the items used in order to identify a relation, for example, a relation determined based on a person's name and an SSN may be stronger than a relation determined based on a credit card number and a home address.

As shown by block 245, the method may include setting the status flag of the related node. By setting the status flag as shown, a node with which a relation was found (the related node) may be marked for further processing. For example and as described herein, an embodiment may select nodes for processing (e.g., search for relations) based on the status flag. Accordingly, by setting the status flag as shown by 245, a node with which a relation was found may be selected as the current node in a subsequent iteration as shown by 210. As shown by block 250, if all asymmetric relation types for the current node have been examined, e.g., no more asymmetric relation types may be determined for the current node, the method may include clearing the status flag of the current node. By clearing the status flag, an embodiment may prevent the current node from being selected in a subsequent iteration as shown by 210.

As shown by block 255, the method may include calculating a network score at the current node. A network score may be calculated as described herein. Generally and as further described herein, a network score may be calculated for a cluster of connected nodes. For example, a set or cluster of connected nodes may be a set of nodes connected by relations identified and/or determined as described herein. As shown by block 260, the method may include relating a network score to a threshold. As shown by block 265, if a network score is above a threshold, a method may include generating or raising an alert. As shown, an alert may include details of the current node, e.g., the node selected as shown by 210. Generating an alert may include any action or means. For example, generating an alert may include sending an electronic mail (e.g., to an administrator), generating an alarm sound using speakers connected to a computing device, displaying a message on a display screen etc. In an embodiment, a system may generate a new work item that may be associated with an alert. A work item may be automatically assigned to a person, e.g., one who is to investigate one or more transactions that were associated with a common risk root cause.

According to embodiments of the invention and as further described herein, e.g., with reference to FIGS. 2 and 3, a relation between a first node included in a first cluster and a second node included in a second cluster may be determined. Based on the relation, the first and second clusters may be joined to produce an extended cluster and a cluster risk score may be calculated for the extended cluster.

Reference is now made to FIG. 3 that shows a method or flow of determining a network score according to embodiments of the invention. The method may include identifying symmetric relation between node pairs and calculating a network score based on one or more symmetric relations. Generally, a symmetric relation may be determined by examining at least two nodes in a network of nodes and determining a relation between the at least two nodes based on information in the examined nodes and/or information related to the two or more networks. For example, an embodiment may select two nodes that include names of persons and may check for a symmetric relation between the nodes by checking whether the two persons are related.

Both symmetric and asymmetric relations may be found between any two nodes in the network. Nodes included in the same cluster or in different clusters may be linked by one or more symmetric and/or asymmetric relations. For example, a given pair of nodes may be connected by one or more symmetric relations as well as by one or more asymmetric relations.

As shown by block 315, two network nodes may be selected. In an embodiment, a node pair may be selected such that a first and second nodes in a node pair are selected from a respective first and second different clusters. For example, a first node may be selected from a first cluster (e.g., node 106 in cluster 102 as shown in FIG. 1A) and a second node may be selected from a second cluster (e.g., node 107 in cluster 101 as shown in FIG. 1A). Any criteria, rule or logic may be utilized in order to select a first and second nodes (node pair). For example, a priori scores of nodes may be examined and a node pair may be selected such that the combined scores of the selected nodes is maximized.

As shown by block 320, a method may iterate over a number of relation types in a relation types set. A relation types set may be defined or configured (e.g., by a user) and may include any number of relation types, e.g., person names, geographically proximate addresses, similar phone numbers etc.

As shown by block 325, the method may determine whether all relation types in the set of relation types have been examined. As shown by block 330, for each relation type, an "is related" function may be executed in order to determine whether the node pair is related with respect to the current relation type. As shown by block 335, if it is determined that the nodes selected as shown by 315 are not related with respect to a current relation type then the method may return to block 325 in order to select the next relation type. As further shown by block 340, if it was determined that the nodes are related with respect to the current relation type than a new relation may be defined. For example, a relation structure or object may be created and a number of fields in the newly created relation object may be set or initialized. For example and as shown, a relation type ID of the current relation type, the relation strength returned by the "is related" function and the node IDs of the current node pair (selected as shown by 315) may be set in the new relation object.

As shown by block 345, a network score may be calculated or recalculated. For example, after determining a relation between a first and second nodes included in a respective first and second networks or clusters of nodes, an extended network or cluster may be defined such that the extended cluster includes the first and second clusters. Otherwise described, a relation between nodes in two clusters may cause embodiments to unite, join or combine the clusters into a single extended cluster. A network or cluster score calculated as shown by block 345 may be a score of the extended cluster. As shown by block 350, the score calculated as shown by block 345 may be compared or otherwise related to a threshold and, as shown by block 355, if the score is above a predefined threshold then an alert may be generated or produced. As further shown by block 355, an alert may include details such as information related to nodes, e.g., the current node pair. As shown by block 360, following a processing of a node pair, a list of node pairs may be updated to include the node pair. For example, nodes included in a list updated as shown by block 360 may be skipped in a subsequent iteration of the flow. Although not shown, if a node included in a node pair is removed from a network, or if information in a node object is updated then the relevant node pair may be removed from the list updated as shown by 360.

As discussed herein, a network or cluster score may be calculated. For example, risk scores may be calculated for clusters 101 and 102 shown in FIG. 1A. Generally, a method for determining a fraud related risk root cause may calculate a fraud related score for a cluster or network of nodes based on risk scores associated with at least some of the nodes in the cluster and further based on the strength of relations between nodes in the cluster. In an embodiment, a network or cluster of nodes may be treated as a undirected graph in the mathematical sense where the nodes (e.g., nodes 103, 104, 106 and 107 shown in FIG. 1A) are the graph vertices and the inter-node relations (e.g., relation 105 shown in FIG. 1A) are the graph edges. A network or cluster risk score may be calculated for a cluster and the cluster or network score associated with each node in a cluster may be the score calculated for the entire cluster.

According to an embodiment of the invention, paths between node pairs in a cluster may be identified. In an embodiment, only paths traversing nodes associated with non-zero a priori scores may be included in a calculation of a cluster score. In an embodiment, only paths that specifically start and end at nodes with non-zero a priori scores may be examined. A cluster score may be calculated using a value function that monotonically increases according to a priori scores associated with nodes on a path and with the relation strengths along a path. In an embodiment, only the scores associated with nodes at a start and end of a path may be considered or used to calculate a cluster score. The status flag of nodes on a path may be examined and if the status flag of a node is set (indicating the relations of the node with other nodes were not yet determined) then the contribution of the node to the cluster score may be set to a predefined, possibly constant value. Increasing the cluster score by a predefined value for nodes which were not yet examined may reflect the potential of such nodes to contribute to the cluster score, e.g., if relations of the node with nodes which are currently not included in the cluster are identified. For example, a node may contribute a first value or amount to a cluster score based on its a priori score and based on one or more relations' strengths with other nodes in the cluster. However, if not all relations of the node with other nodes have been determined or identified, then the contribution of the node to the cluster score may increase, e.g., if additional nodes are included in the cluster based on relations of the node with other nodes which are currently not included in the cluster and/or based on yet unidentified relations of the node with nodes in the cluster.

In an embodiment, a cluster score may be calculated according to the following formulae:

$$A'(\chi) = \begin{cases} A(\chi) + C & \text{if status} = 1 \\ A(\chi) & \text{otherwise} \end{cases}$$

$$NS(g) = \sum_{p \in paths(g)} A'(p_1) A'(p_2) \prod_{r \in relations(p)} RelStr(r)$$

Figure 4:
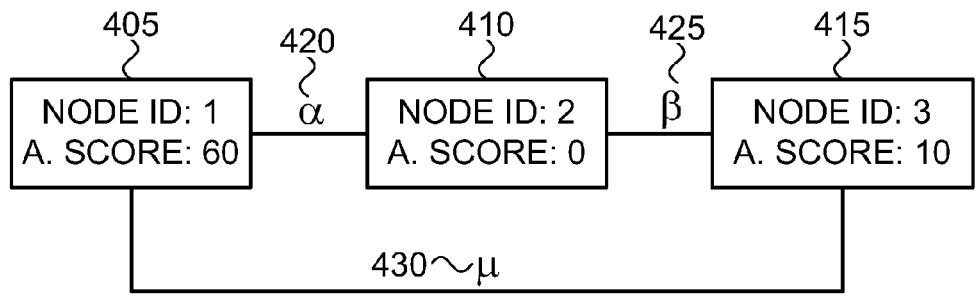
FIG. 4 graphically exemplifies a cluster of nodes according to embodiments of the present invention.

Where:
$A(\chi)$ represents the a priori score of node x
C represents a constant value reflecting the expected cluster score for a randomly selected unprocessed node having an a priori score of zero.
NS(g) represents the cluster score of a cluster g
paths(g) represents the set of all paths in cluster g
$p_1$ $p_2$ represent the two ends of a path p correspondingly
relations(p) represents the set of all relations within a path p
RelStr(r) represents the relation strength of a relation r Reference is now made to FIG. 4 that graphically exemplifies a cluster of nodes and inter node relations according to embodiments of the present invention. FIG. 4 may be used to further clarify the above formulae. For example, if nodes 405, 410 and 415 have all been processed and all relations in the cluster including these three nodes have been identified then, according to the formula above, all paths terminating at node 410 would contribute a zero value to the cluster score because the a priori score of node 410 is zero. The summation in the cluster score would therefore include only 2 non-zero terms, corresponding to the 2 possible paths between nodes 405 and 415—one going through node 410, contributing a value of $60*10*\alpha*\beta$, and another going directly from node 405 to node 415, contributing a value of $60*10*\mu$. The total cluster score would therefore be $60*10*\alpha*\beta+60*10*\mu$.

If node 410 is unprocessed (e.g., its status flag is set to "TRUE"), it would be treated as if its' a priori score were the constant C rather than zero. In such case, according to the formula above, 4 more terms would be added to the sum as follows: $60*c*\alpha+60*c*\mu*\beta+10*c*\beta+10*c*\mu*\alpha$. Other formulas may also be used. For example, the product of the relation strengths in the formula above may be replaced with other operators on the same set of relations. For example, the maximum relation strength, the minimum relation strength or the sum of relation strengths may all be used.

In order to calculate or determine a risk root cause, a cluster risk score may be calculated. In order to calculate a cluster score, nodes may be selected for processing as described herein. For example, in order to calculate a cluster score for nodes 405, 410 and 415 shown in FIG. 4, any one of nodes 405, 410 and 415 may be selected as the first node to be processed. A cluster score calculated for a cluster may be associated with some or all nodes included in the cluster. When large clusters are evaluated, e.g., when a score for a very large cluster is calculated, it may be important to define the order or preference when selecting nodes for processing.

Various methods, considerations or algorithms may be used in order to select a node for processing. For example, preference may be given to nodes with a higher cluster score. For example, an unprocessed node (e.g., having a status flag that is non-zero) that is further associated with a cluster score that is greater than or equal to a predefined threshold may be selected as the next node to be processed. In other cases, a selection logic may prefer nodes that were recently updated.

In an embodiment, the potential contribution of a node to a cluster score may be evaluated and nodes may be selected for processing based on their potential or capacity to increase the cluster score. An estimated potential contribution to a cluster's risk score may be determined by calculating the risk score based on an assumption that the node is indeed linked or otherwise related to nodes which are currently not included in the cluster.

Generally, the order of selecting nodes for processing may be based on a potential or capacity of nodes to contribute to a cluster score. For example, in order to select for processing one of a first and second unprocessed nodes in a cluster, a first calculation of the cluster score may be performed when treating the first node as a processed node (e.g., temporarily setting the status flag of the first node to "0") and a second calculation of the cluster score may be performed when treating the second node as a processed node. The two cluster scores may be compared thus determining which of the two nodes has a greater potential or capacity to increase the cluster score. The node having a higher potential or capacity to increase the cluster score may be selected first for processing. Selecting nodes based on a potential contribution to a cluster score as described herein may enable embodiments to prefer (e.g., prioritize the processing of) nodes that have more and/or stronger known relations with nodes with high a priori scores. In other embodiments, unprocessed nodes may be randomly selected for processing. Any other method or logic for selecting nodes for processing may be implemented or applied. It will be realized that the scope of the present invention is not limited by the method or order of selecting nodes for processing.

Figure 5A:
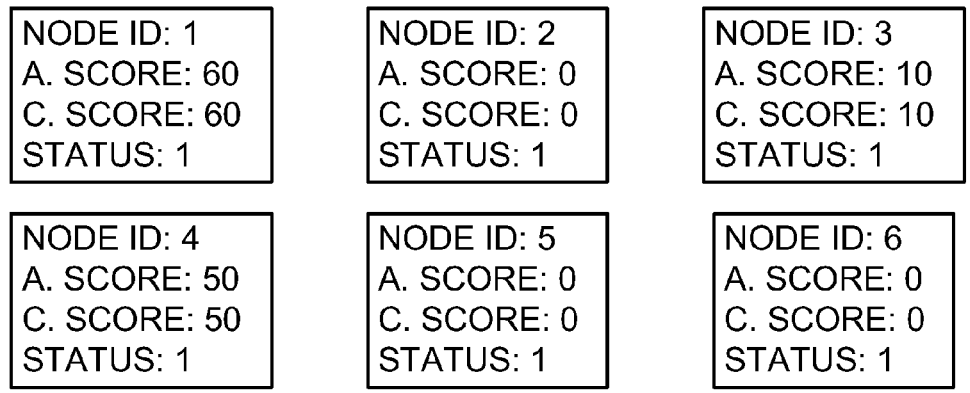
FIGS. 5A, 5B, 5C, 5D, 5E, 5F, 5G and 5H graphically show a calculation of a cluster score according to embodiments of the present invention.
Figure 5B:
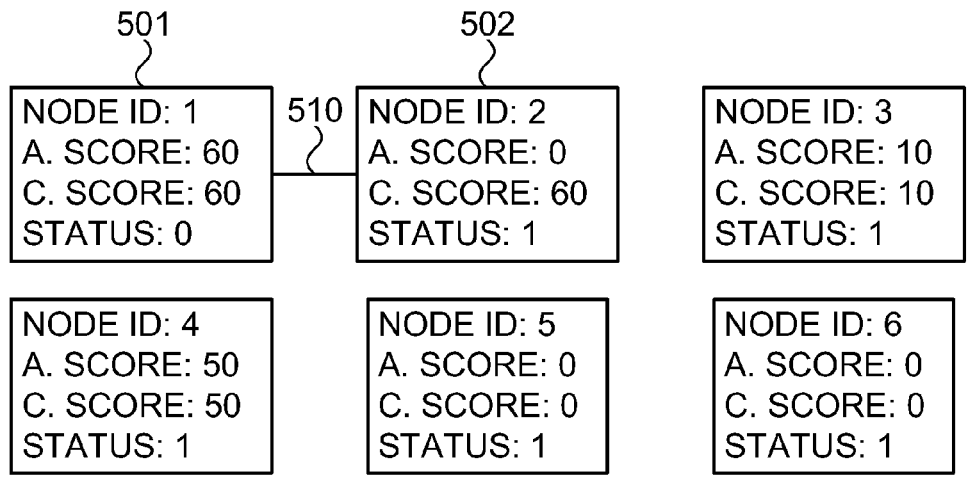

Reference is now made to FIGS. 5A, 5B, 5C, 5D, 5E, 5F and 5G which graphically show a cluster of nodes and related data according to embodiments of the present invention. As shown by FIG. 5A, a network of nodes may include a set of six nodes. In an embodiment, a node selection criteria may select the next or first node for processing by selecting, from all nodes with a non-zero status, the node having the highest cluster score. Accordingly, node 501 having a status of 1 as shown and a cluster score of 60 (which is the highest cluster score in the cluster shown) may be selected as the first node for examination or processing, e.g., the first node for which relations with other nodes are searched for. As shown by FIG. 5B, a relation 510 between node 501 and node 502 may be identified or detected. A cluster score may be calculated for the cluster including nodes 501 and 502 according to the formula described above where the constant "c" in the above formula is set to "1". Accordingly, a cluster score may be calculated by $60*(0+1)=60$. As shown by FIG. 5B, the cluster score of nodes 501 and 502 is then set to 60.

Figure 5C:
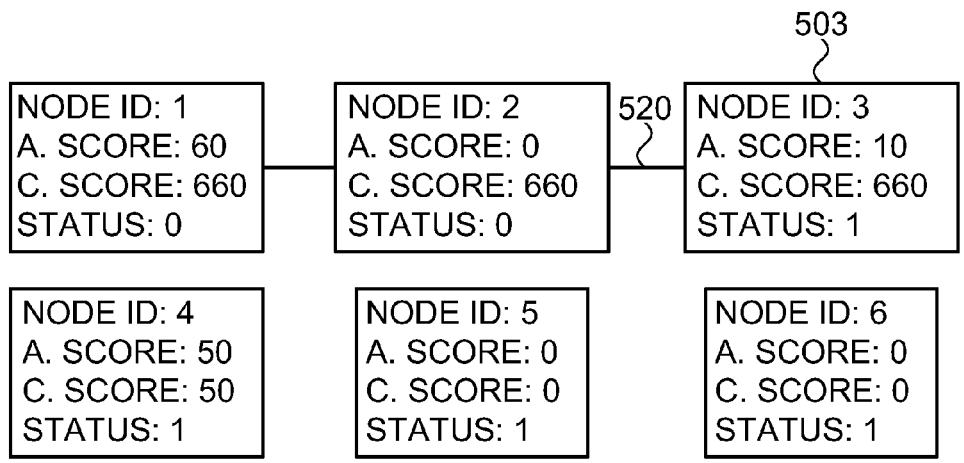
Figure 5D:
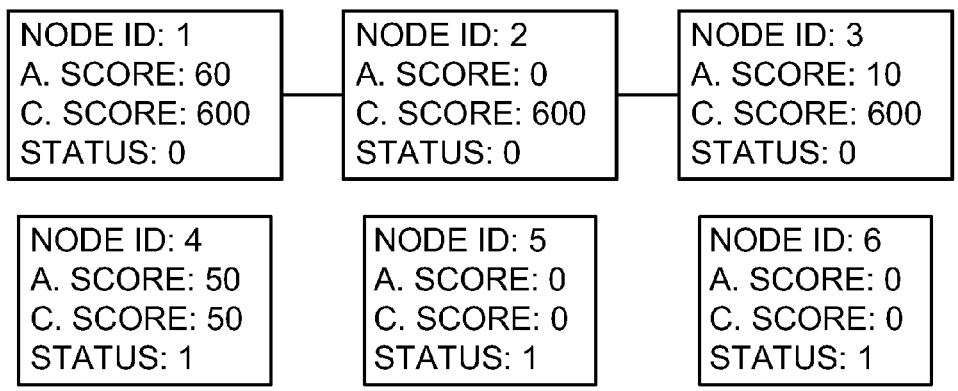

Since the status of node 501 is set to "0", node 502 is selected next. As shown by 520 in FIG. 5C, a relation between nodes 502 and 503 is found. A cluster score (for the cluster now including inter-related nodes 501, 502 and 503) may be calculated according to $60*(10+1)=660$. As shown by FIG. 5D, since no relations between node 503 and any additional nodes is found, the cluster score may be recalculated according to the above formula, namely by $60*10=600$. A decrease of the cluster score from 660 to 600 reflects the fact that relations between nodes in the cluster are now fully explored and a possibility of identifying additional relations (that may in turn contribute to the cluster score) does not exist. Otherwise described, prior to determining that node 503 has no additional relations, the cluster score of 660 as shown in FIG. 5C reflects the possibility that additional relations between node 503 and other nodes will contribute to the cluster score. Accordingly, following a determination that node 503 has no relations other than the one detected (with node 502), the risk score may be lowered as shown by FIG. 5D.

Figure 5E:
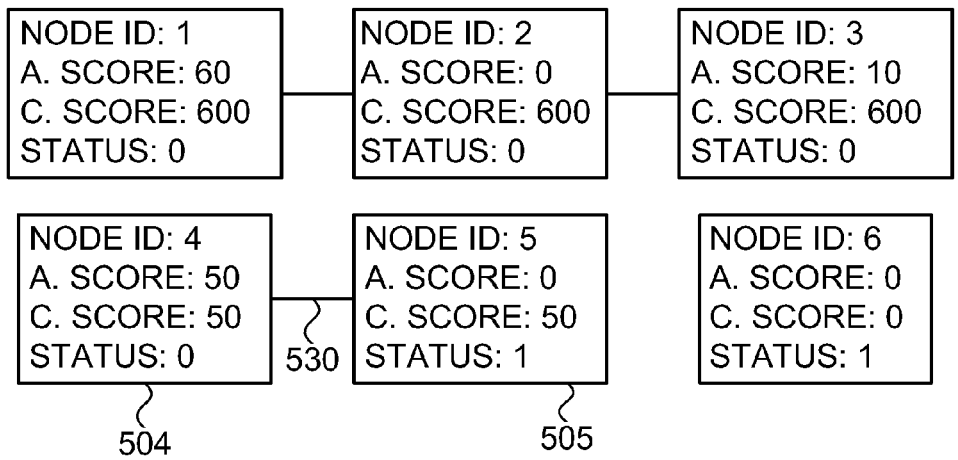
Figure 5F:
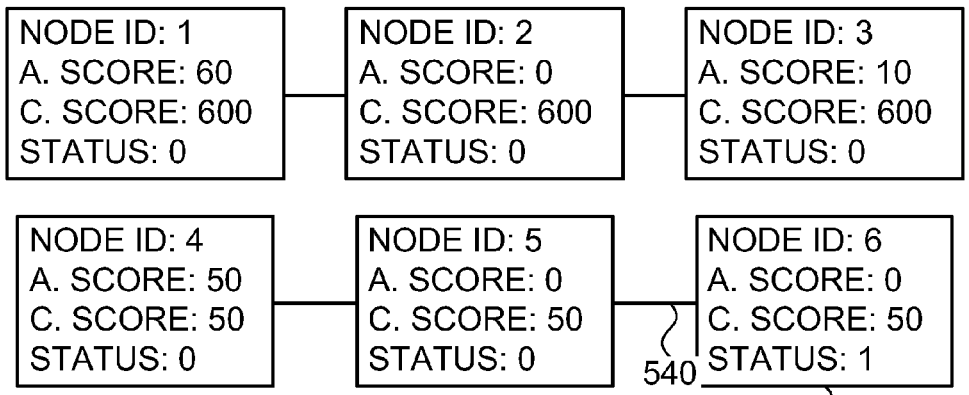
Figure 5G:
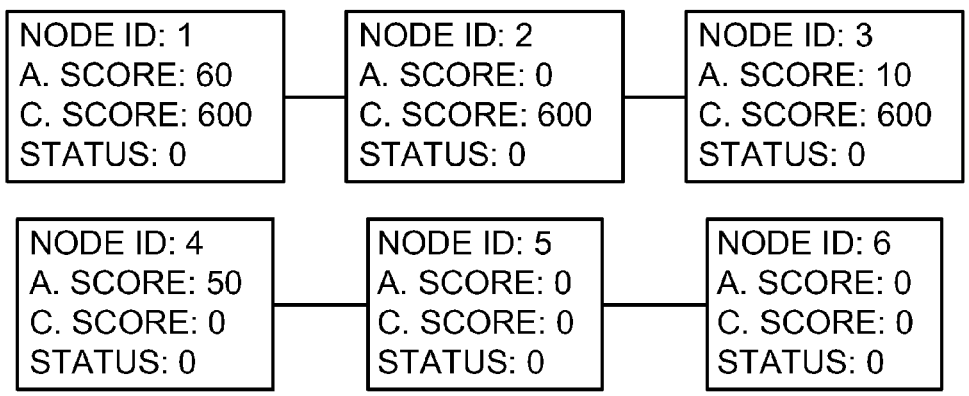

As shown by FIG. 5E, node 504 may be selected next (e.g., based on its risk scores and status) and a relation between node 504 and 505 may be identified as shown by 530. A cluster score of 50 for the cluster including nodes 504 and 505 may be calculated according to $50*(0+1)=50$. As shown by FIG. 5F, node 505 may be selected next and a relation 540 between nodes 505 and 506 may be identified. Accordingly, a cluster score for the cluster now including nodes 504, 505 and 506 may be calculated using the above formula, namely, by $50*(0+1)=50$. As shown by FIG. 5G, node 506 may be selected and it may further be determined that node 506 has no additional relations. Accordingly, the cluster score of the cluster including nodes 504, 505 and 506 may be set to 0 according to the above formula. The cluster risk score of zero reflects the fact that the fully explored cluster including nodes 504, 505 and 506 does not include any pair of nodes that have non-zero a priori scores. Otherwise described, clustering nodes 504, 505 and 506 does not raise or increase the risk score. Accordingly, a system or method may determine that clustering a set of nodes does not reveal any root cause that may be common to the set of nodes. For example, if a cluster only includes one risky node, then clustering the risky node with additional nodes does not reveal any relation between multiple risky nodes.

Figure 5H:
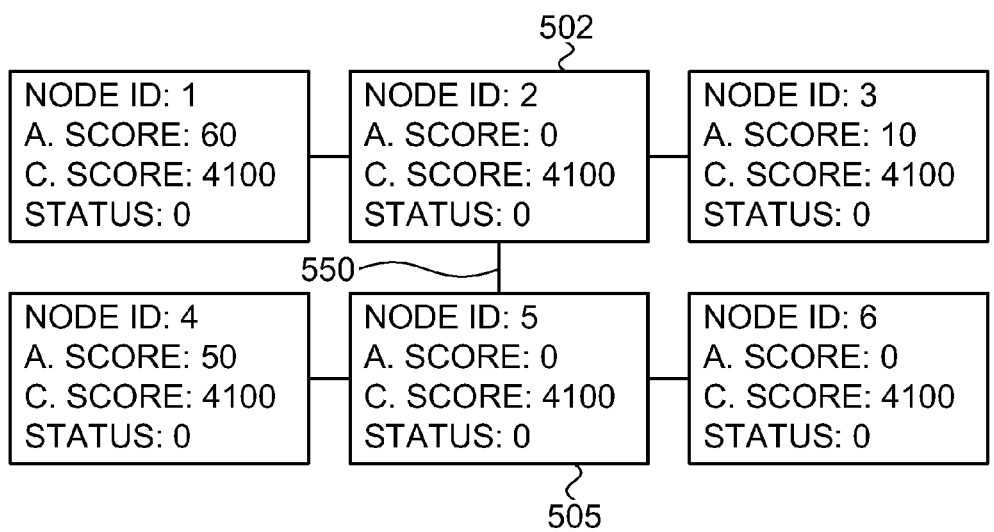

As shown by FIG. 5H, a symmetric relation 550 between nodes 505 and 502 may be identified. For example, according to a logic described herein, nodes 504 and 502 may be selected and existence of symmetric relations between them may be checked. Since a relation 550 between nodes 504 and 502 is found, a cluster score for the cluster including nodes 501-506 is calculated by 60*10+60*50+10*50=4100. If a predefined threshold of 1000 is defined, then the cluster risk score of 4100 as shown by FIG. 5H may cause an embodiment to generate an alarm for the cluster including nodes 501-506.

Figure 6:
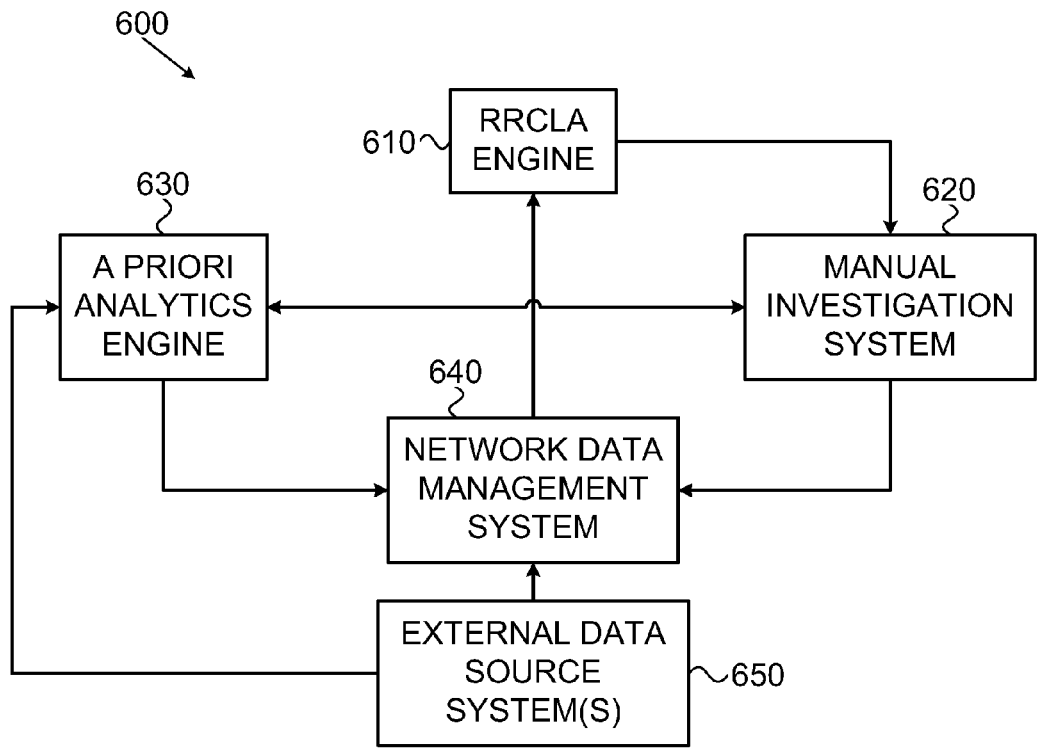
FIG. 6 shows a high level block diagram of a system according to embodiments of the present invention.

Reference is now made to FIG. 6 which shows a system 600 according to embodiments of the present invention. System 600 may implement methods as described herein, for example, system 600 may implement the methods described herein with reference to FIGS. 2 and 3. As shown, system 600 may include a risk root cause link analysis (RRCLA) engine 610, a manual investigation system 620, an a priori analytics engine 630, a network data management system 640 and external data source systems 650. In order to perform methods and operations described herein, components of system 600 may perform operations as described below.

RRCLA engine 610 may iterate over nodes in a network of nodes and identify symmetric and/or asymmetric relations between nodes. RRCLA engine 610 may receive data, information or parameters related to events and/or entities, their a priori scores, and relations between them from the network data management system 640. RRCLA engine 610 may store any information (e.g., obtained or calculated) related to nodes, clusters and inter-node relations. For example, data objects described herein (e.g., with reference to FIG. 1A) may be stored by RRCLA engine 610 and may be used as described herein. RRCLA engine 610 may generate alarms, e.g., when a cluster risk score is greater than a predefined threshold as described herein.

A priori analytics engine 630 may receive data related to nodes. For example, data related to events and entities (represented by nodes as described herein) may be received from external data source systems 650. Based on information received from external data source systems 650 or any other information, a priori analytics engine 630 may determine and set a priori scores for new and/or updated nodes, events and entities. A priori analytics engine 630 may detect relations between nodes, e.g., using the "get relations" and/or "is related" functions described herein. A priori analytics engine 630 may generate and send alerts. For example, a priori analytics engine 630 may send alerts to manual investigation system 620 based on a priori scores. A priori analytics engine 630 may sends score and relation data to network data management system 640. A priori analytics engine 630 may receive alert investigation results from manual investigation system 620 and may update a priori scores accordingly.

Network data management system 640 may store data related to nodes, events and entities, a priori scores, and relations between nodes. Network data management system 640 may receive information from a number of components of system 600. For example, network data management system 640 may receive data related to nodes and relations between nodes from external data source systems 650. Network data management system 640 may receive data related to a priori scores and additional relations from a priori analytics engine 630. Network data management system 640 may receive data related to node updates from manual investigation system 620, thus allowing users to manually override network data. For example, a user may create, update and/or remove nodes from a network or cluster of nodes or modify relations between nodes. Network data management system 640 may provide RRCLA engine 610 with data related to nodes, events or entities, a priori scores and relations between nodes.

Manual investigation system 620 may enable a user to interact with system 600. For example, manual investigation system 620 may include a graphical user interface (GUI) component that may be used by a user in order to investigate alerts and/or store investigation results. Manual investigation system 620 may enable a user to view and/or overwrite network data. For example, manual investigation system 620 may enable a user to set a priori or cluster risk scores or modify relations between nodes. Manual investigation system 620 may receive information from any component of system 600, e.g., alerts from RRCLA engine 610 or a priori analytics engine 630 may be received by manual investigation system 620 and may be stored or provided to a user. Manual investigation system 620 may provide components of system 600 with information. For example, manual investigation system 620 may send investigation results to a priori analytics engine 630 or send network data updates to network data management systems 650.

External data source systems 650 may store data related to nodes, events or entities and/or relations between nodes. External data source system 650 may send updates related to nodes, events or entities and/or relations to other components of system 600, e.g., to a priori analytics engine 630 and/or network data management system 640.

Embodiments of the invention may be used or employed for various purposes or combined with various systems. For example, system 600 may be used to detect frauds related to deposits, new account openings and/or initial account funding. In such capacity, information related to suspicious new account openings may be sent to RRCLA engine 610. The a priori score of each account opening may initially be determined by risk indicators found in the account opening details. The a priori score may be decreased over time (e.g., every day) so that all non-recent account openings eventually get an a priori score of zero.

RRCLA engine 610 may analyze any customer and account related data, e.g., addresses (home addresses, mailing addresses etc.), identification parameters (e.g., SSN, Drivers license identification parameters, Passport numbers etc.) or person names. RRCLA engine 610 may look for suspicious commonalities and/or similarities between the details of separate account openings. Accordingly, RRCLA engine 610 may identify, for example, a single address (e.g., home or mailing address) associated with 20 account openings within several weeks and/or an address that is similar to several other addresses associated with 20 additional account openings within the same timeframe. Accordingly, a resulting cluster score determined for a cluster that includes the newly opened accounts may be higher than a threshold and an alert may be generated, thus detecting an attempted deposit fraud.

In another case, embodiments of the invention may be applicable to detecting frauds related to cash withdrawal transactions, e.g., using an automated teller machine (ATM). For example, RRCLA engine 610 may be provided with information related to confirmed fraudulent withdrawals. A predefined or constant a priori score may be associated with such confirmed fraudulent withdrawals and may further be decreased over time, e.g. as described herein. RRCLA engine 610 may analyze other, e.g., more recent transactions (not necessarily suspicious ones) which are made using the same cards used for the fraudulent transactions. RRCLA engine 610 may look for suspicious common ATM terminals. For example, using cluster scoring as described herein, RRCLA engine 610 may identify a single ATM terminal associated with 100 transactions on different cards on the same day, approximately 3 weeks prior to the corresponding fraudulent transactions. A cluster score for a relevant cluster may accordingly be high and an alert may be generated, uncovering a possible point of compromise e.g. skimming device or compromised ATM.

In yet another scenario, fraudulent merchants or frauds related to point of sale terminals may be identified. For example, information related to confirmed fraudulent transactions may be provided to RRCLA engine 610 that may set an initial a priori score for related nodes as described above. RRCLA engine 610 may analyze other, e.g., more recent transactions (not necessarily suspicious ones) related the same cards as the fraudulent transactions, and may look for suspicious common merchants or point of sale terminals. RRCLA engine 610 may identify a single merchant associated with 100 transactions on different cards on the same day, approximately 3 weeks prior to the corresponding fraudulent transactions. Accordingly, a resulting cluster score may be high and an alert is generated, uncovering a possible fraudulent merchant.

In another field, mass mail thefts may be detected. In an embodiments, data relevant to confirmed fraudulent transactions related to remote banking, as well as unconfirmed transactions with high risk scores, is provided to RRCLA engine 610. An initial a priori score may be associated with nodes that represent transactions based on a remote banking fraud risk score and a predefined or constant a priori score may be associated may be associated with confirmed fraudulent transactions. The scores may be decreases over time as described above. RRCLA engine 610 may analyze details of the compromised accounts associated with the transactions, e.g., addresses (home addresses, mailing addresses etc.), ID numbers (SSN, Drivers license number, Passport number and the like), and person names. RRCLA engine 610 may look for suspicious commonalities and/or similarities between the details of separate compromised accounts. RRCLA 610 may identify a single address associated with 10 compromised accounts within several weeks. The resulting cluster score may accordingly be higher than a threshold and an alert may be generated, uncovering a mass mail theft at the address leading to multiple account takeovers.

Figure 7:
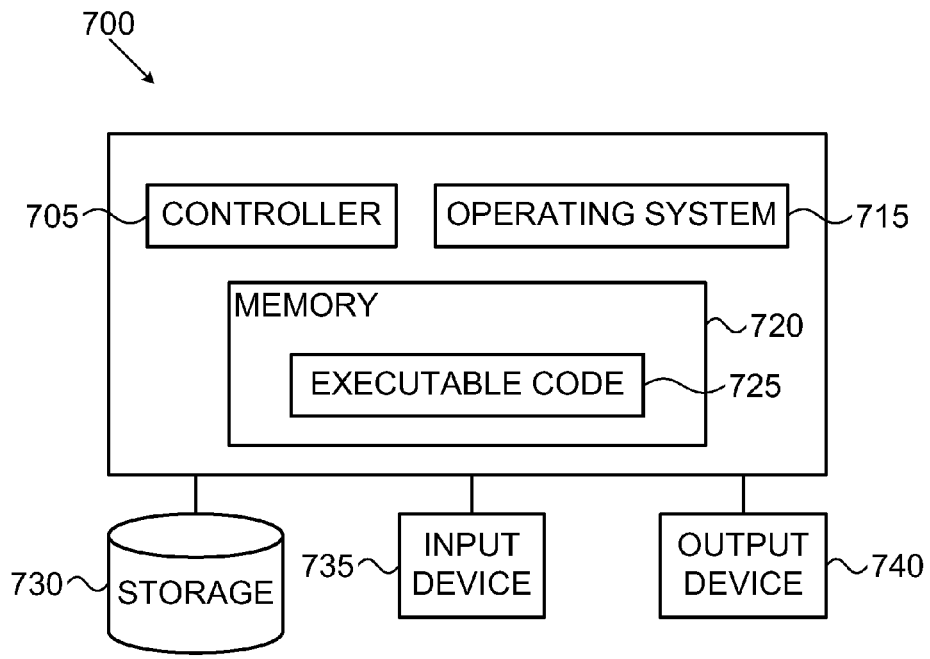
FIG. 7, shows a high level block diagram of an exemplary computing device according to embodiments of the present invention.

Reference is made to FIG. 7, showing high level block diagram of an exemplary computing device according to embodiments of the present invention. Computing device 700 may include a controller 705 that may be, for example, a central processing unit processor (CPU), a chip or any suitable computing or computational device, an operating system 715, a memory 720, a storage 730, an input devices 735 and an output devices 740.

Operating system 715 may be or may include any code segment designed and/or configured to perform tasks involving coordination, scheduling, arbitration, supervising, controlling or otherwise managing operation of computing device 700, for example, scheduling execution of programs. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by controller 705 possibly under control of operating system 715. For example, executable code 725 may be an application designed and/or configured to determine a first and second node fraud related risk scores respectively associated with a first and second nodes, determine a relation strength value related to at least one relation between the first and second nodes, and use the relation strength value and the first and second node risk scores to calculate a cluster risk score for a cluster of nodes that includes the first and second nodes.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 730 and may be loaded from storage 730 into memory 720 where it may be processed by controller 705. For example, any content stored by system 600 described herein may be stored on storage 730.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 720, computer-executable instructions such as executable code 725 and a controller such as controller 705.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EE- PROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for determining risk root cause link, the method comprising:
   determining, by a computing device, a first and second fraud related risk scores respectively associated with a first and second nodes;
   determining, by the computing device, a relation strength value related to at least one relation between the first and second nodes; and
   using by the computing device, a value function that monotonically increases according to the first and second node risk scores and the relation strength value to calculate a cluster risk score for a cluster of nodes, the cluster including at least the first and second nodes; and
   wherein calculating a cluster risk score comprises:
   determining at least one path between a first and second nodes, the at least one path including at least one relation between two nodes included in the cluster;
   determining a relation strength value of at least one relation included in the path and a first and second node risk scores respectively associated with the first and second nodes; and
   calculating the cluster risk score based on the relation strength values and based on the node risk scores.

2. The method of claim 1, comprising extending the cluster to include an additional node, wherein extending the cluster includes:
   determining an additional relation strength value related to at least one relation between the additional node and a node included in the cluster; and
   using the additional relation strength value and a node risk score associated with the additional node to calculate a cluster risk score for the extended cluster.

3. The method of claim 1, wherein a path between the first and second nodes includes a relation between the first node and a third node and a relation between the third node and the second node.

4. The method of claim 1, comprising associating a node with a constant node risk score if not all paths traversing the node have been determined.

5. The method of claim 1, comprising producing an alert if the cluster risk score is greater than a determined threshold.

6. The method of claim 1, comprising:
   determining a relation between a first node included in a first cluster and a second node included in a second cluster;
   joining the first and second clusters to produce an extended cluster; and
   calculating a cluster risk score for the extended cluster.

7. The method of claim 1, comprising selecting one of the first and second nodes based on estimating their respective potential contribution to the cluster risk score.

8. The method of claim 1, comprising dynamically modifying a cluster risk score based on an event related to a node included in the cluster.

9. An article comprising a non-transitory computer-readable storage medium, having stored thereon instructions, that when executed on a computer, cause the computer to:
   determine a first and second fraud related risk scores respectively associated with a first and second nodes;
   determine a relation strength value related to at least one relation between the first and second nodes; and
   use a value function that monotonically increases according to the first and second node risk scores and the relation strength value to calculate a cluster risk score for a cluster of nodes, the cluster including at least the first and second nodes; and
   wherein calculating a cluster risk score comprises:
   determining at least one path between a first and second nodes, the at least one path including at least one relation between two nodes included in the cluster;
   determining a relation strength value of at least one relation included in the path and a first and second node risk scores respectively associated with the first and second nodes; and
   calculating the cluster risk score based on the relation strength values and based on the node risk scores.

10. The article of claim 9, wherein the instructions when executed further result in extending the cluster to include an additional node, wherein extending the cluster includes:
    determining an additional relation strength value related to at least one relation between the additional node and a node included in the cluster; and
    using the additional relation strength value and a node risk score associated with the additional node to calculate a cluster risk score for the extended cluster.

11. The article of claim 9, wherein a path between the first and second nodes includes a relation between the first node and a third node and a relation between the third node and the second node.

12. The article of claim 9, wherein the instructions when executed further result in associating a node with a constant node risk score if not all paths traversing the node have been determined.

13. The article of claim 9, wherein the instructions when executed further result in producing an alert if the cluster risk score is greater than a determined threshold.

14. The article of claim 9, wherein the instructions when executed further result in:
    determining a relation between a first node included in a first cluster and a second node included in a second cluster;
    joining the first and second clusters to produce an extended cluster; and
    calculating a cluster risk score for the extended cluster.

15. The article of claim 9, wherein the instructions when executed further result in selecting one of the first and second nodes based on estimating their respective potential contribution to the cluster risk score.

16. The article of claim 9, wherein the instructions when executed further result in dynamically modifying a cluster risk score based on an event related to a node included in the cluster.

* * * * *